United States Patent [19]

Sevini et al.

[11] Patent Number: 4,960,593
[45] Date of Patent: Oct. 2, 1990

[54] PROCESS FOR PREPARING THERMALLY STABLE OLEFINIC POLYMERS

[75] Inventors: Franco Sevini, Bologna; Luciano Noristi, Ferrara, both of Italy

[73] Assignee: Himont Incorporated, Wilmington, Del.

[21] Appl. No.: 331,702

[22] Filed: Mar. 31, 1989

Related U.S. Application Data

[63] Continuation-in-part of Ser. No. 115,657, Oct. 27, 1987, abandoned, which is a continuation of Ser. No. 826,260, Feb. 2, 1986, abandoned.

[51] Int. Cl.$^5$ ................................................ C08K 5/34
[52] U.S. Cl. ........................................ 524/99; 524/100; 524/102; 524/103; 526/204
[58] Field of Search ................. 526/78, 79, 204, 260, 526/265, 125, 119; 524/99, 100, 102, 103

[56] References Cited

U.S. PATENT DOCUMENTS

| 3,925,376 | 12/1975 | Chalmers | 524/101 |
|---|---|---|---|
| 4,104,248 | 8/1978 | Cantatore | 525/529 |
| 4,107,413 | 8/1978 | Giannini et al. | 526/124 |
| 4,107,414 | 8/1978 | Giannini et al. | 526/124 |
| 4,146,502 | 3/1979 | Yokoyama et al. | 526/137 |
| 4,177,186 | 12/1979 | Rody et al. | 524/102 |
| 4,210,612 | 7/1980 | Karrer | 526/265 |
| 4,226,741 | 10/1980 | Luciani et al. | 526/125 |
| 4,233,410 | 11/1980 | Rody et al. | 525/424 |
| 4,276,401 | 6/1981 | Karrer | 526/265 |
| 4,294,949 | 10/1981 | Karrer | 526/265 |
| 4,298,718 | 11/1981 | Mayr et al. | 526/122 |
| 4,308,362 | 12/1981 | Wiezer et al. | 526/265 |
| 4,311,820 | 1/1982 | Nikles | 526/265 |
| 4,315,859 | 2/1982 | Nikles | 544/198 |
| 4,321,374 | 3/1982 | Morimura et al. | 544/198 |
| 4,331,561 | 5/1982 | Luciani et al. | 536/128 |
| 4,356,287 | 10/1982 | Loffelman | 526/265 |
| 4,369,274 | 1/1983 | Thomas | 526/265 |
| 4,376,836 | 3/1983 | Wiezer et al. | 544/198 |
| 4,386,177 | 5/1983 | Loffelman | 524/100 |
| 4,435,555 | 3/1984 | Loffelman et al. | 526/261 |
| 4,442,250 | 4/1984 | Cantatore | 524/98 |
| 4,461,898 | 7/1984 | Meier et al. | 524/102 |
| 4,550,136 | 10/1985 | Husch | 526/204 |
| 4,583,426 | 8/1989 | Chatterjee | 524/100 |
| 4,593,064 | 6/1986 | Hosch | 526/204 |
| 4,731,393 | 3/1988 | Karrer et al. | 524/99 |
| 4,824,885 | 4/1989 | Magni et al. | 524/120 |

FOREIGN PATENT DOCUMENTS 65655 12/1982 European Pat. Off. .
255181 2/1988 European Pat. Off. .

OTHER PUBLICATIONS

Research Disclosure, 85–91, Aug. 1973.

Primary Examiner—Veronica P. Hoke

[57] ABSTRACT

Thermally stable olefin polymers are obtained by addition, before or during polymerization, or after polymerization is substantially complete, but before quenching the catalyst, which terminates the polymerization reaction, of stabilizers of the HALS type ("Hindered Amine Light Stabilizer") of monomeric or oligomeric type, containing in the molecule one or more substituted piperidyl groups having formula:

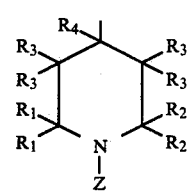

wherein R1 are the same or different from each other and are $C_1$–$C_4$ alkyl radicals, tetramethylpiperidyl radicals, or the alkyl radicals, together with the piperidyl carbon atom to which they are bonded, form a $C_5$–$C_9$ cycloalkyl radical; $R_2$ are the same or different from each other and are hydrogen, $C_1$–$C_{18}$ alkyl radicals, $C_7$–$C_{18}$ aralkyl radicals, or said alkyl radicals together with the piperidyl carbon atom to which they are bonded, are a $C_5$–$C_{10}$ cycloalkyl radical; $R_3$ are the same or different from each other and are hydrogen, $C_1$–$C_{18}$ alkyl radicals or $C_7$–$C_{18}$ aralkyl radicals; $R_4$ is hydrogen, a $C_1$–$C_8$ alkyl radical or a benzyl radical; Z is hydrogen or an organic radical. Suitable organic radicals include $C_1$–$C_{18}$ alkyl; $C_1$–$C_{12}$ alkylene; $C_3$–$C_{12}$ alkenyl; $C_3$–$C_5$ alkenyl; $C_7$–$C_{18}$ aralkyl; $C_2$–$C_4$ acyl; $C_2$–$C_{18}$ alkanoyl; $C_3$–$C_{18}$ alkoxyalkyl; $C_3$–$C_{18}$ alkenoyl; oxyl; cyanomethyl, and xylylenyl radicals; a radical having valence from 1 to 4 and containing from 1 to 4 hydroxyl groups and, optionally, containing ether, ester, or heterocyclic groups, all the valences of this radical being bonded to the nitrogen of the piperidyl rings; a bivalent radical containing one or more ester or amide groups, and a radical

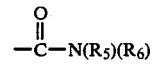

wherein $R_5$ and $R_6$ are hydrocarbyl radicals.

Preferably Z is a $C_1$–$C_{12}$ alkyl, $C_3$–$C_8$ alkenyl, $C_7$–$C_{11}$ aralkyl, or a bivalent radical containing one or more ester groups wherein the two valences of said radicals are bonded to piperidyl rings.

22 Claims, No Drawings

PROCESS FOR PREPARING THERMALLY STABLE OLEFINIC POLYMERS

BACKGROUND OF THE INVENTION

This application is a continuation-in-part of our application S.N. 07/115657, filed Oct. 27, 1987, now abandoned, which is a continuation of our application S.N. 06/826260, filed Feb. 2, 1986, now abandoned.

Attempts have been made in the past, to stabilize olefin polymers by adding hindered phenolic stabilizers during the polymerization reaction. According to U.S. Pat. No. 3.477.991 monomers containing an ortho-hindered phenolic group are copolymerized with olefins, using a catalyst system based on $TiCl_3$ and Al-alkyls. The resulting copolymers are reported to have thermal and oxidative stability. According to European patent application no. 3836, the stabilization of polyethylene, produced using chromium-based catalysts, is obtained by addition, during polymerization, of a phenolic type stabilizer.

The direct stabilization during polymerization is of particular interest in the case of the recent processes for the production of polyolefins using high yield stereospecific catalysts supported on activated Mg dichloride. In these processes the resultant polymer is in the form of particles having controlled morphology and size such that a granulation step is not required. The stabilization of olefin polymers by adding the phenolic stabilizer(s) during the polymerization by means of such high yield supported stereospecific catalysts, does not lead, however, to satisfactory results because the phenolic stabilizers adversely affect the catalyst performances, cause a yellowing of the polymer and/or give rise to undesired effects on the polymer morphology. The yellowing due to the presence of some phenolic compounds also occurs when the same are added to the slurry at the end of the polymerization prior to quenching the catalyst

THE PRESENT INVENTION

This invention provides for the stabilization of the olefin polymers, for instance polypropylene, polyethylene and elastomeric propylene/ethylene/(diene) copolymers, which stabilization is carried out by adding a Hindered Amine Light stabilizer (HALS) type, either at the start, or during, or after polymerization is substantially complete, but before quenching the catalyst, which terminates the polymerization reaction. By operating, in this way it is possible to avoid the typical drawbacks caused by the phenolic stabilizers. The HALS are stabilizers containing in the molecule one or more substituted piperidyl groups having the following general formula:

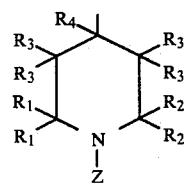

wherein R1 are the same or different from each other and are $C_1$-$C_4$ alkyl radicals, tetramethylpiperidyl radicals or the alkyl radicals together with the piperidyl carbon atom to which they are bonded, form a $C_5$-$C_9$ cycloalkyl radical; $R_2$ are the same or different from each other and are hydrogen, $C_1$-$C_{18}$ alkyl radicals, $C_7$-$C_{18}$ aralkyl radicals, or said alkyl radicals together with the piperidyl carbon atom to which they are bonded, are a $C_5$-$C_{10}$ cycloalkyl radical; $R_3$ are the same or different from each other and are hydrogen, $C_1$-$C_{18}$ alkyl radicals or $C_7$-$C_{18}$ aralkyl radicals; $R_4$ is hydrogen, a $C_1$-$C_8$ alkyl radical or a benzyl radical; Z is hydrogen or an organic radical Suitable organic radicals include $C_1$-$C_{18}$ alkyl; $C_1$-$C_{12}$ alkylene; $C_3$-$C_{12}$ alkenyl; $C_3$-$C_5$ alkynyl; $C_7$-$C_{18}$ aralkyl; $C_2$-$C_4$ acyl; $C_2$-$C_{18}$ alkanoyl; $C_3$-$C_{18}$ alkoxyalkyl; $C_3$-$C_{18}$ alkenoyl; oxyl; cyanomethyl, and xylylenyl radicals; a radical having valence from 1 to 4 and containing from 1 to 4 hydroxyl groups and, optionally containing ether, ester, or heterocyclic groups, all the valences of this radical being bonded to the nitrogen of the piperidyl rings; a bivalent radical containing one or more ester or amide groups, and a radical

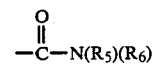

wherein $R_5$ and $R_6$ are hydrocarbyl radicals.

Preferably Z is a $C_1$-$C_{12}$ alkyl, $C_3$-$C_8$ alkenyl, $C_7$-$C_{11}$ aralkyl, or a bivalent radical containing one or more ester groups wherein the two valences of said radical are bonded to piperidyl rings.

The HALS stabilizers suitable for the purpose of the present invention, can be oligomeric products (A), or monomeric products (B).

The oligomeric products (A) may be represented by one of the following general formulas:

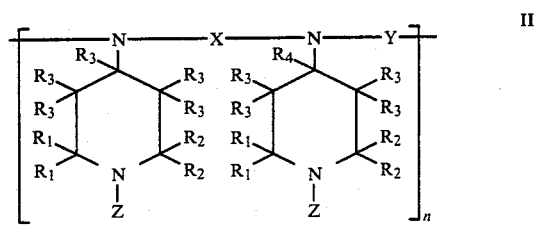

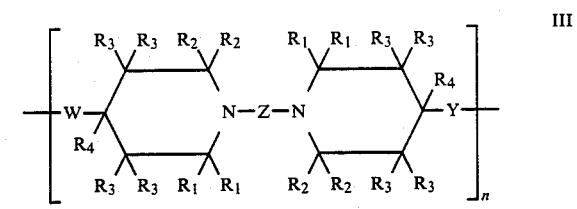

wherein
n is a whole number from 2 to 100;
$R_1$, $R_2$, $R_3$ and $R_4$ have the meaning as defined for structure I;
X is a bivalent organic radical, preferably a $C_1$-$C_{12}$ alkylene radical or a bivalent radical containing one or more ester or amide groups;
W is a direct chemical bond or a bivalent organic radical, preferably a $C_1$-$C_{12}$ alkylene radical,

radical (wherein R is hydrogen or a $C_1$-$C_{18}$ alkyl radical), or —O—;

Y is a direct chemical bond,, or a bivalent aliphatic, cycloaliphatic, aromatic or heterocyclic organic radical containing N or O, S, P atoms in the chain or in the heterocyclic ring.

Z in formula II has the same meaning as in formula I;

Z in formula III is a $C_1$–$C_{12}$ alkylene radical or a bivalent radical containing one or more ester or amide groups.

Methods of preparing the compounds of formula (II) are known from U.S. Pat. No. 4104248 the preparation methods of which are incorporated herein by reference.

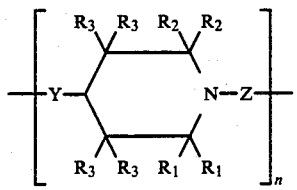

IV wherein:

n, Y, $R_1$, $R_2$, $R_3$ and $R_4$ have the same meaning as defined for formulas II and III, Z the same meaning as formula III.

Methods of preparing the compounds of formula III and IV are known from U.S. Pat. No. 4233410 the preparation methods of which are incorporated herein by reference.

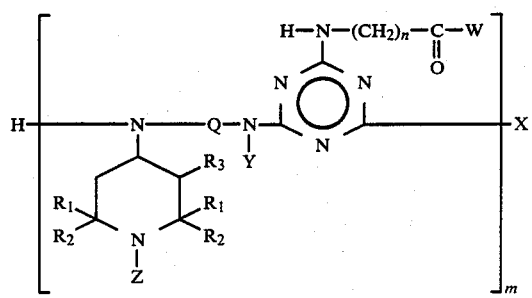

V wherein:

W is a $C_1$–$C_{20}$ alkoxyl or

radical;

$R_5$ $R_6$ are the same or different and are hydrogen or a $C_1$–$C_{18}$ alkyl radical;

$R_3$ hydrogen, a $C_1$–$C_{18}$ alkyl, or benzyl radical;

radicals $R_1$ and $R_2$ are the same or different from each other and are $C_1$–$C_8$ alkyl, benzyl, phenylethyl radicals or together with the piperidyl carbon atom to which they are bonded, are a $C_5$–$C_{10}$ cycloalkyl radical;

Z is hydrogen, a $C_2$–$C_3$ hydroxyalkyl, $C_1$–$C_{18}$ alkyl, or hydroxyl radical;

Q is a $C_2$–$C_{20}$ linear or branched alkylene, $C_5$–$C_{10}$ cycloalkylene, $C_6$–$C_{12}$ arylene, $C_8$–$C_{14}$ aralkylene radical;

Y is hydrogen, a $C_1$–$C_{20}$ alkyl radical, or a radical of formula:

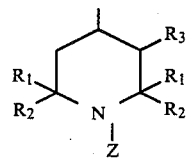

wherein n is a whole number from 1 to 3;

m is a whole number greater than 1;

X is halogen or a $C_1$–$C_8$ alkylamino, di($C_1$–$C_8$)alkylamino, pyrrolidyl or morpholino radical.

Methods of preparing the compounds of formula V are described in U.S. Pat. No. 4386177 the preparation methods of which are incorporated herein by reference.

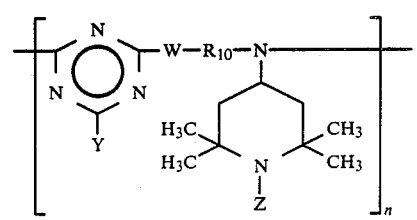

VI wherein:

n is a whole number from 2 to 20;

Y is a radical having formula $R_{14}O—$ or $(R_{15})(R_{13})N—$, wherein $R_{14}$ and $R_{15}$ are $C_3$–$C_7$ alkenyl radicals, $R_{13}$ has the meaning hereinafter described;

W is a bivalent radical having formula —O— or

wherein $R_{17}$ is hydrogen, or a $C_-C_{12}$ alkyl, $C_3$–$C_7$ alkenyl, cyclohexyl, benzyl radical, or a radical having formula:

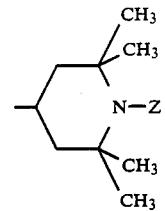

where

Z is hydrogen, a $C_1$–$C_{12}$ alkyl, $C_3$–$C_7$ alkenyl, $C_7$–$C_{11}$ phenylalkyl, cyanomethyl, $C_2$–$C_{18}$ alkanoyl, $C_3$–$C_{18}$ alkenoyl, —CON($R_5$)($R_6$) or —$CH_2$—CH($R_7$)—OH radical;

$R_5$ is a $C_1$–$C_{12}$ alkyl, allyl, cyclohexyl, benzyl, phenyl, or $C_7$–$C_{12}$ alkylphenyl radical;

$R_6$ is hydrogen, a $C_{1-C12}$ alkyl, allyl, or benzyl radical;

$R_5$ and $R_6$, together with the nitrogen atom to which they are bonded, may form a 5–6 member heterocyclic ring;

$R_7$ is hydrogen, a $C_1$–$C_{12}$ alkyl, phenyl, $C_2$–$C_{13}$ alkoxymethyl or phenoxymethyl radical;

$R_{10}$ is a $C_1$-$C_{12}$ alkylene, whose chain may be interrupted by 1, 2 or 3 —O— or —N($R_9$)— radicals, or a $C_6$-$C_{14}$ cycloalkylene radical or cycloalkylendialkylene radical;

$R_9$ is hydrogen, a $C_1$-$C_{12}$ alkyl, $C_3$-$C_7$ alkenyl, cyclohexyl, or —CH$_2$—CH($R_7$)—OH radical or a radical of the formula:

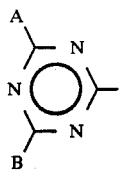

wherein:

A and B are the same or different from each other, and are (a) a $R_{11}$ —O— or

radical, wherein:

$R_{11}$ is a $C_1$-$C_{12}$ alkyl, $C_3$-$C_7$ alkenyl, $C_3$-$C_{12}$ alkoxyalkyl, $C_4$-$C_{12}$ dialkylaminoalkyl, cyclohexyl, benzyl, phenyl, $C_7$-$C_{12}$ alkylphenyl radical;

$R_{12}$ is a $C_1$-$C_{12}$ alkyl, $C_3$-$C_7$ alkenyl, $C_5$-$C_8$ cycloalkyl, $C_3$-$C_{12}$ alkoxyalkyl, $C_5$-$C_{12}$ alkenoxyalkyl, $C_4$-$C_{12}$ dialkylaminoalkyl, —CH$_2$—CH($R_7$)—OH, phenyl, $C_7$—$C_{12}$ alkylphenyl, or $C_7$-$C_{11}$ phenylalkyl radical;

$R_{13}$ is hydrogen, a $C_1$-$C_{12}$ alkyl, $C_3$-$C_7$ alkenyl, $C_5$-$C_8$ cycloalkyl, $C_3$-$C_{12}$ alkoxyalkyl, $C_5$-$C_{12}$ alkenoxyalkyl, $C_4$-$C_{12}$ dialkylaminoalkyl, $C_2$-$C_{12}$ alkanoyl, $C_3$-$C_{12}$ alkenoyl, —CH$_2$—CH($R_7$)—OH, or $C_7$-$C_{11}$ phenylalkyl radical, or $R_{12}$ and $R_{13}$ together with the nitrogen atom to which they are bonded form a 5 or 6 member heterocyclic ring, or (b) a radical having formula:

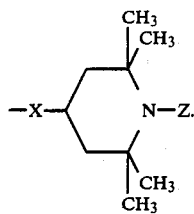

wherein

X is a bivalent radical having the formulae —O—, —NH—CH$_2$—CH$_2$—, —NH—(CH$_2$)$_2$—O—, —NH(CH$_2$)$_3$—O—, or —N—($R_{10}$—N—($R_9$)—;

wherein $R_8$ is hydrogen, a $C_1$-$C_{12}$ alkyl, $C_3$-$C_7$ alkenyl, cyclohexyl, $C_3$-$C_{12}$ alkoxyalkyl, $C_5$-$C_{12}$ alkenoxyalkyl, $C_4$-$C_{12}$ dialkylaminoalkyl, benzyl, or CH$_2$—CH($R_7$)—OH radical, or a radical having formulae:

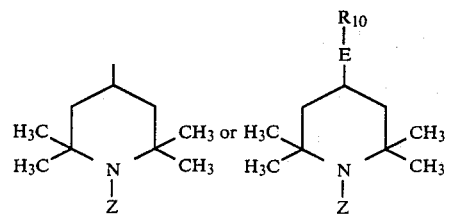

wherein

E is a bivalent group having formula —O— or NR$_9$;

$R_9$ and $R_{10}$ have the same meaning as defined above; provided that at least one of Z, $R_5$, $R_6$, $R_7$, $R_8$, $R_9$, $R_{11}$, $R_{12}$, $R_{13}$ is an alkenyl or alkenoyl group.

Methods of preparing the compounds having formula VI are described in U.S Pat. No. 4,731,393 the preparation methods of which are incorporated herein by reference The monomeric products (B) contain in the molecule one or more piperidyl rings, optionally substituted and bound to each other, said piperidyl rings having general formula I as illustrated hereinbefore.

Among the products of group (B) suitable products may be represented by one of the following general formulas:

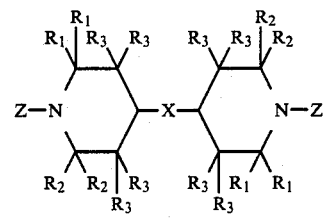

VII wherein in $R_1$, $R_2$, $R_3$ and Z have the meaning indicated for formula I; X has the same meaning as in formula II. Methods of preparing the compounds of formula VII are known from U.S. Pat. No. 4233410 the preparation methods of which are incorporated herein by reference.

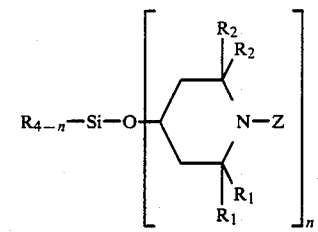

VIII wherein

Z and radicals $R_1$ and $R_2$ have the same meaning as in formula I

R is an alkyl, alkenyl or phenyl radical n is a whole number from 1 to 3

Methods of preparing the compounds of this formula IX are described in U.S. Pat. No. 4461898 the preparation methods of which are incorporated herein by reference.

[Formula IX]

wherein:

$R_5$ is a $C_1$–$C_{14}$ alkyl radical $R_6$ and $R_3$ are hydrogen or methyl radical Z is hydrogen, a $C_1$–$C_{12}$ alkyl, $C_3$–$C_8$ alkenyl, $C_7$–$C_{11}$ aralkyl, cyanomethyl or $C_2$–$C_4$ acyl radical $R_7$ is a $C_1$–$C_{18}$ alkylene, $C_2$–$C_{18}$ oxalkylene, $C_2$–$C_8$ alkenylene radical.

Methods of preparing the compounds of this formula IX are described in U.S. Pat. No. 4461898 the preparation methods of which are incorporated herein by reference.

Other suitable monomeric products of group (B) are those products containing, in their molecule 1,3,5-triazine rings and substituted piperidyl rings and, optionally, the products containing in the molecule one or more unsaturated olefin chains as well.

Compounds of this type are represented by the following general formula:

[Formula X]

wherein:

Q is a bivalent organic radical. Suitable bivalent radicals include a $C_1$–$C_{12}$ alkylene or phenylene radical, or a radical having formula $$-(CH_2)_3-N-(CH_2)_3-;$$
$$\phantom{-(CH_2)_3-}\overset{|}{CH_3}$$

W is a substituted piperidylamino radical;

R is H, a $C_1$–$C_{18}$ alkyl or a monovalent organic radical. Substituted piperidyl radicals are typical monovalent organic radicals.

y is 1 or zero x and m are 1, 2 or 3 n is 2 or 3

Methods of preparing the compounds of such general formula X are described for instance in U.S. Pat. No. 4.433.145 the preparation methods of which are incorporated herein by reference.

[Formula XI]

wherein:

R is a $C_1$–$C_{18}$ alkylene radical and Z is hydrogen.

Methods of preparing the compounds of general formula XI are described in U.S. Pat. No. 4,731,393 the preparation methods of which are incorporated herein by reference.

[Formula XII]

wherein:

R is a $C_3$–$C_6$ oxyalkenyl, $C_3$–$C_6$ aminoalkenyl, or di-($C_3$–$C_6$ alkenyl) amino radical;

$R_3$ is hydrogen, a $C_1$–$C_8$ alkenyl, or benzyl radical;

$R_1$ $R_2$ are the same or different from each other, and are $C_1$–$C_8$ alkyl, benzyl or phenylethyl radicals or they form, together with the piperidyl carbon atom to which they are bonded a $C_5$–$C_{10}$ cycloalkyl group, Z is hydrogen, a $C_2$–$C_3$ hydroxyalkyl, $C_1$–$C_8$ alkyl or hydroxyl radical;

Q is —O—, or $$\overset{|}{\underset{|}{N}}-R_7$$

group; wherein $R_7$ is hydrogen or a $C_1$–$C_{18}$ alkyl or a radical of the formula wherein $R_4$ is the same as $R_3$;

Y and Y' are the same or different and are —O— or

group

X is a $C_2$–$C_{12}$ alkylene, wherein the alkylene chain may be interrupted by a Q group, as defined hereinbefore or by a thio group; a $C_5$–$C_{10}$ cycloalkylene, or $C_6$–$C_{12}$ arylene or $C_8$–$C_{14}$ aralkylene radical.

Methods of preparing the compounds having formula XII are described in U.S. Pat. No. 4435555 the preparation methods of which are incorporated herein by reference.

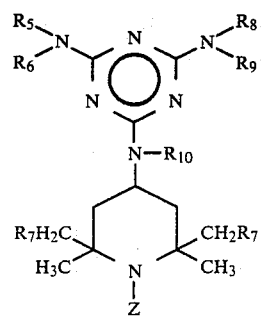

XIV

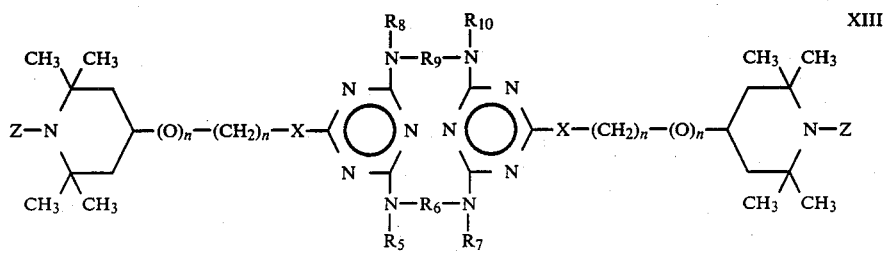

XIII wherein:

$R_5$, $R_7$, $R_8$ and $R_{10}$ are the same or different from each other and are hydrogen, a $C_1$–$C_{12}$ alkenyl, $C_2$–$C_6$ hydroxyalkyl, $C_3$–$C_{12}$ alkenyl, $C_5$–$C_{12}$ cycloalkenyl, $C_6$–$C_{12}$ substituted or non-substituted aryl, or $C_7$–$C_{12}$ substituted or non-substituted aralkyl radical;

$R_6$ and $R_9$ are the same or different and are a $C_2$–$C_{12}$ alkylene, $C_4$–$C_{12}$ iminodialkylene or oxadialkylene, $C_5$–$C_{12}$ cycloalkylene, $C_6$–$C_{12}$ arylene, or $C_7$–$C_{12}$ aralkylene radical;

O is oxygen; Z is hydrogen;

X is —O—, —S— or $$-\overset{|}{\text{N}}-R_{11},$$

wherein $R_{11}$ is a radical having formula

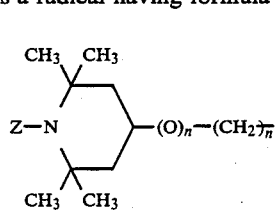

wherein Z is hydrogen;

n is zero or 1 and
r is zero or 1, 2 or 3.

Methods of preparing the compounds of formula XIII are described in U.S. Pat. No. 4.442.250 the preparation methods of which are incorporated herein by reference.

wherein:

Z is hydrogen;

$R_5$, $R_6$, $R_8$, $R_9$ and $R_{10}$ are the same or different and are a $C_1$–$C_{18}$ alkyl, $C_5$–$C_{12}$ cycloalkyl, $C_7$–$C_{14}$ aralkyl radical, or a radical having formula:

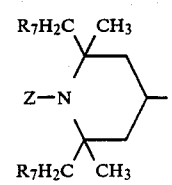

XV or a radical having formulae

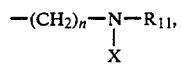

or

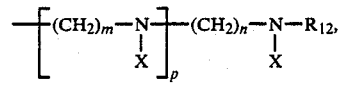

wherein
Z is hydrogen;
$R_7$ is hydrogen or a $C_1$–$C_5$ alkyl radical;
$R_{11}$ and $R_{12}$ are the same or different and are hydrogen, a $C_1$–$C_{18}$ alkyl, $C_5$–$C_{12}$ cycloalkyl, or $C_7$–$C_{14}$ phenylalkyl radical; m and n are the same or different and are whole numbers from 2 to 6;
p is a whole number from 0 to 3.
X is a radical having formula:

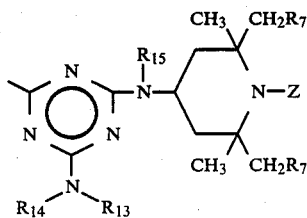

and

R$_{14}$ and R$_{15}$ are the same or different and are hydrogen;

a C$_1$-C$_{18}$ alkyl, optionally substituted by hydroxyl, alkoxyl, C$_1$-C$_4$ dialkylamino groups;

C$_5$-C$_{12}$ cycloalkyl or phenyl radical, substituted by C$_1$-C$_{18}$ alkyl radicals; R$_{13}$ is hydrogen, a C$_1$-C$_{18}$ alkyl, C$_5$-C$_{12}$ cycloalkyl or C$_7$-C$_{14}$ aralkyl radical, or a radical having formula XV R$_3$ is the same as R$_7$ as defined above for formulas XIV and XV and 2 is hydrogen.

Methods of preparing the compounds of such formula XIV are described in U.S. Pat. No. 4376836 the preparation methods of which are incorporated herein by reference.

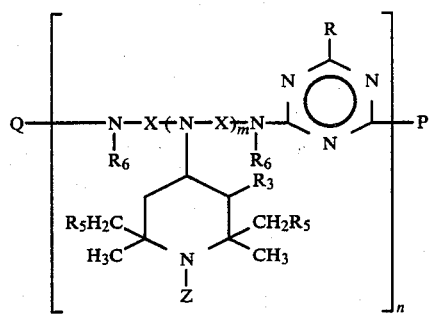

XVI wherein:

Z is hydrogen, C$_1$-C$_{18}$ alkyl, C$_3$-C$_{12}$ alkenyl, C$_3$-C$_5$ alkynyl, C$_3$-C$_{18}$ alkoxyalkyl, C$_2$-C$_4$ hydroxyalkyl, optionally substituted by phenyl or phenoxy groups, or C$_7$-C$_{18}$ aralkyl radical;

R$_3$ and R$_5$ are hydrogen or methyl radicals

R is hydrogen, cyano, phenyl, azido, hydrazido radical or —OR$_9$, —SR$_9$, or

radical wherein

R$_9$ is hydrogen, C$_1$-C$_{18}$ alkyl, C$_3$-C$_{12}$ alkenyl, C$_3$-C$_{18}$ alkoxylalkyl, C$_5$-C$_{12}$ cycloalkyl, C$_7$-C$_{18}$ aralkyl, C$_6$-C$_{10}$ aryl radical;

R$_7$ and R$_8$ are the same or different and are hydrogen, C$_1$-C$_{23}$ alkyl, C$_3$-C$_{18}$ alkenyl, C$_3$-C$_5$ alkynyl, C$_2$-C$_4$ hydroxyalkyl, C$_2$-C$_5$ cyanoalkyl, C$_5$-C$_{12}$ cycloalkyl, C$_7$-C$_{18}$ aralkyl, or C$_6$-C$_{16}$ aryl radical; R$_6$ is hydrogen, C$_1$-C$_{23}$ alkyl, C$_3$-C$_{12}$ cycloalkyl, C$_7$-C$_{18}$ aralkyl, or C$_6$-C$_{10}$ aryl radical;

X is a C$_2$-C$_6$ alkylene radical;

P has the same meaning as hereinafter described;

Q is hydrogen, or a C$_1$-C$_{24}$ acyl radical, or a radical having formula:

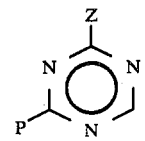

wherein

Z has the same meaning as defined for formula XVI;
P is halogen;

hydroxyl; a —OMe radical, wherein Me is an alkaline or alkaline-earth metal having valence 1 or 2;

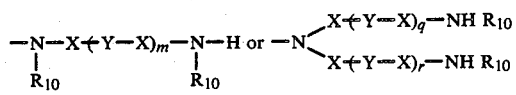

radical wherein:

R$_{10}$ is the same as Q, C$_1$-C$_{23}$ alkyl, C$_3$-C$_{12}$ cycloalkyl, C$_7$-C$_{18}$ aralkyl, or C$_6$-C$_{10}$ aryl radical;

X is a C$_2$-C$_6$ alkylene radical;

Y is —O—, or —S—, or —NR$_{10}$;

m in formula XVI and in the formulas for P is a whole number from 0 to 4 n is a whole number from 1 to 3 p is a whole number from 0 to 3 q is 0, 1 or 2; and r is 0, 1, 2 or 3;

whereas the sum r+q cannot be higher than 3.

The compounds of formula XVI are monomeric when m and n are equal to 1.

Methods of preparing the compounds of formula XVI are described in U.S. Pat. No. 4315859 the preparation methods of which are incorporated herein by reference.

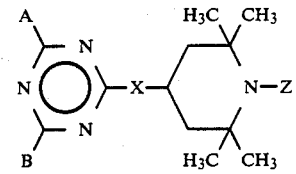

XVII wherein Z, X, A and B, have the same meaning as in formula VI.

Methods of preparing the compounds having general formula XVII are described in U.S. Pat. No. 4,731,393 the preparation methods of which are incorporated herein by reference.

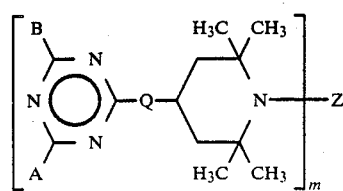

XVIII wherein m is 2, 3 or 4;

Z is an organic radical having the valence m. Suitable organic radicals include $C_2$-$C_{12}$ alkylene, $C_4$-$C_8$ alkenyl, xylylene, —$CH_2$—CH(OH)—$CH_2$—, —$CH_2$—CH(OH)—$CH_2$—X—$CH_2$—, —CH(OH)—$CH_2$—, $+CH_2$—CH(OH)—$CH_2 \overline{\uparrow_3} D$, $+CH_2$—CH(OH) —$CH_2 \overline{\uparrow_4} Y$ radical wherein:

X is —O—$R_{14}$—O— or —OOC—$R_{15}$—COO— radical, wherein $R_{14}$ and $R_{15}$ are bivalent aliphatic, cycloaliphatic, aromatic or araliphatic radicals;

D is a trivalent aliphatic or a heterocyclic radical;

Y is a tetravalent aliphatic radical;

Q is —O—, or —N($R_{16}$)—, wherein:

$R_{16}$ is hydrogen, $C_1$-$C_{12}$ alkyl, $C_3$-$C_7$ alkenyl, cyclohexyl, $C_2$-$C_4$ hydroxyalkyl, $C_3$-$C_{12}$ alkoxyalkyl, $C_5$-$C_{12}$ alkenoxyalkyl, $C_4$-$C_{12}$ dialkylaminoalkyl, or benzyl radical.

A and B have the same meaning as expressed in formula VI, provided that the molecule contains at least an alkenyl or alkenoyl group.

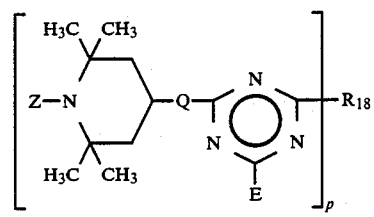
XIX wherein:

E and Z have the same meaning as in formula VI;

Q has the same meaning as in formula XVIII;

$R_{18}$ is an organic radical, having valence p, of a polyol or of a polyamine;

p is 2, 3 or 4.

Methods of preparing the compounds having formula XVIII and XIX are described in U.S. Pat. No. 4,731,393 the preparation methods of which are incorporated herein by reference.

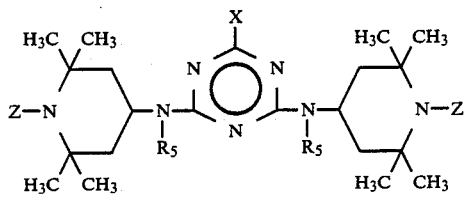
XX wherein:

X is

—$OR_8$; —$SR_8$ radical, or a radical having the formula:

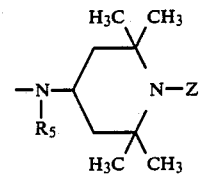

wherein

Z is hydrogen, $C_1$-$C_4$ alkyl, benzyl, allyl, acetyl, acryloyl, oxyl, —$CH_2CH(R_{10})$OH, Z is hydrogen, $C_1$-$C_4$ alkyl, benzyl, allyl, acetyl, acryloyl, oxyl, —$CH_2CH(R_{10})OH$, —$CH_2CH(OH)CH_2O$—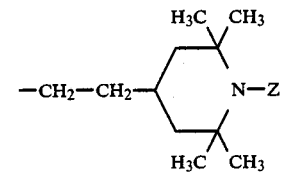, or a —$CH_2CN$ radical;

or a —$CH_2CN$ radical;

$R_5$ is a $C_1$-$C_{18}$ alkyl; $C_5$-$C_{12}$ cycloalkyl; $C_7$-$C_{11}$ aralkyl; $C_3$-$C_{12}$ alkyl, whose chain is interrupted by —O— or by —N($R_9$)—radicals; $C_2$-$C_6$ carboxyalkyl; $C_3$-$C_{12}$ alkoxycarboxalkyl; or an —A—O—Q radical, wherein A is methylene, ethylene or trimethylene, and Q is a phenyl, unsubstituted or mono, bi or trisubstituted by $C_1$-$C_4$ alkyl radicals, or Q is a radical having formula:

Z is hydrogen, $R_6$ and $R_7$ are the same or different and are $C_1$-$C_{18}$ alkyl, $C_5$-$C_{12}$ cycloalkyl, $C_7$-$C_{11}$ aralkyl, $C_3$-$C_{12}$ alkyl radical whose chain is interrupted by —O— or $-\overset{|}{N}(R_9)$ radical, $C_2$-$C_4$ hydroxyalkyl, $C_3$-$C_{15}$ acyloxyalkyl, $C_2$-$C_6$ carboxyalkyl, or $C_3$-$C_{12}$ alkoxycarbonylalkyl radicals or $R_6$ and $R_7$ may form, together with the nitrogen atom to which they are bonded a heterocyclic ring. $R_7$ may also be hydrogen.

$R_8$ is $C_1$-$C_{18}$ alkyl, $C_3$-$C_{12}$ alkenyl, $C_5$-$C_{12}$ cycloalkyl, $C_7$-$C_{11}$ aralkyl, or $C_3$-$C_{12}$ alkyl radical, whose chain is interrupted by an —O— or $-\overset{|}{N}(R_9)$ radical;

$R_9$ is a $C_1$-$C_4$ alkyl radical;

$R_{10}$ is a methyl, ethyl or phenyl radical.

Methods of preparing the compounds of formula XX are described in U.S. Pat. 3,925,376, said methods are incorporated herein by reference.

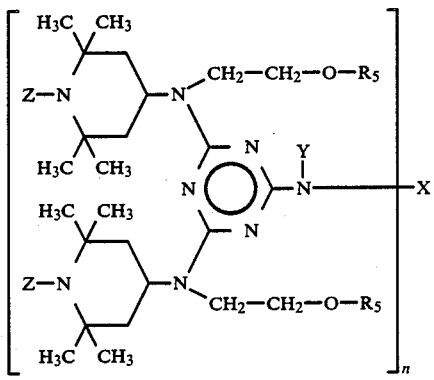

wherein:

Z is hydrogen or methyl radical;

H5 is hydrogen, $C_1$-$C_{18}$ alkanoyl, or 3-(3,5-di-t.-butyl-4-hydroxyphenyl) propionyl radical;

n is 1 or 2.

When n is 1,

X is $C_1$-$C_{18}$ alkyl, benzyl, -$CH_2$-$CH_2$-$OR_5$ radical, where $R_5$ is as defined above for formula XXI;

Y is hydrogen, or a radical having the formula

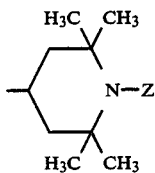                                    XXII or having the formula:

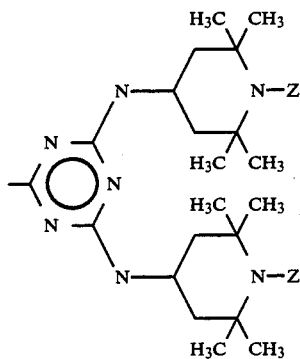                                   XXIII when n is 2

X is $C_2$-$C_6$ alkylene, xylylene radical or a radical having formula:

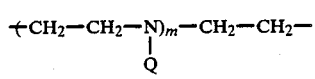

wherein m is a whole number from 1 to 4;

Q is a radical having the formula XXIII;

Y is hydrogen, or a group having formula XXII

Methods of preparing the compounds of formula XXI are described in U.S. Pat. No. 4,321,374 the preparation methods of which are incorporated herein by reference.

Preferred compounds, in general formula II, have the following formulas:

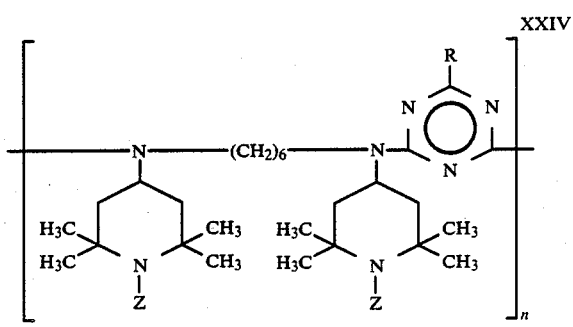                                  XXIV wherein:

n is a whole number from 2 to 20; Z is hydrogen and R is a

or

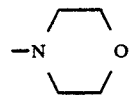

radical;

wherein $R_5$ is $C_1$-$C_{10}$ alkyl radical, and preferably —$C(CH_3)_2$—$CH_2$—$C(CH_3)_3$ radical, and

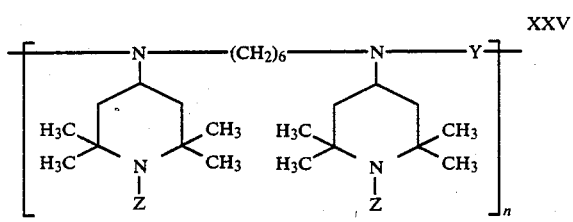                                   XXV wherein n is a whole number from 2 to 20, Y is a direct chemical bond or a radical —$CH_2$—$CH_2$—and Z is hydrogen.

Preferred compounds within general formula III have the following formula:

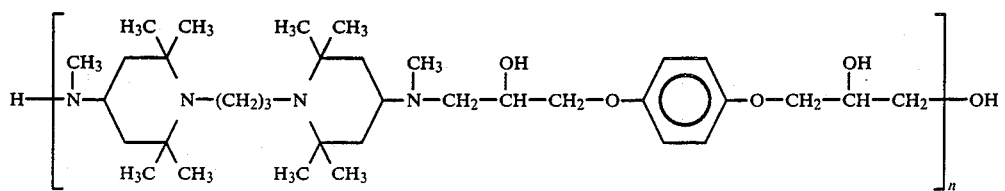
XXVI wherein n is a whole number from 2 to 20.

wherein Z is hydrogen or a methyl radical

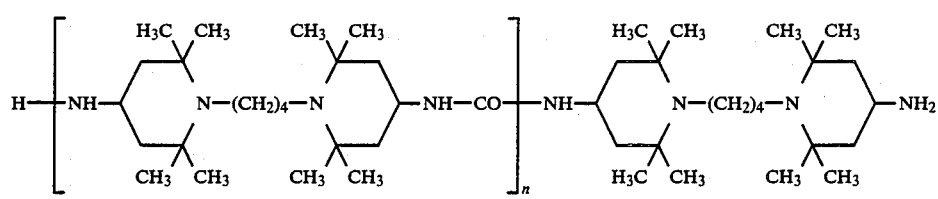
XXVII wherein n is a whole number from 2 to 20.

Preferred compounds within the general formula IV have the following formula:

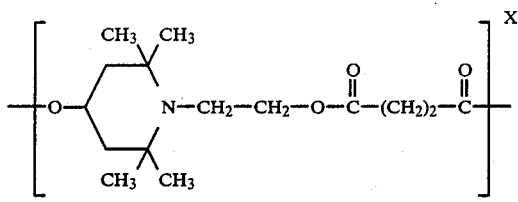
XXVIII

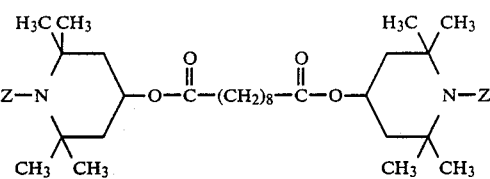
XXX wherein Z is hydrogen.

Preferred compounds of formula VIII are comprised in the following formula:

wherein n is a whole number from 2 to 20.

Preferred compounds of formula VII have the following formulas:

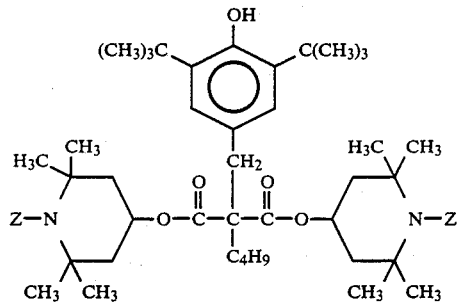
XXIX

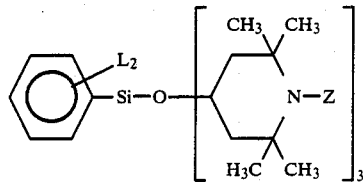
XXXI wherein L is H, halogen, or $C_1$–$C_4$ alkyl radical and Z is hydrogen.

Preferred compounds of general formula X have formulas of type:

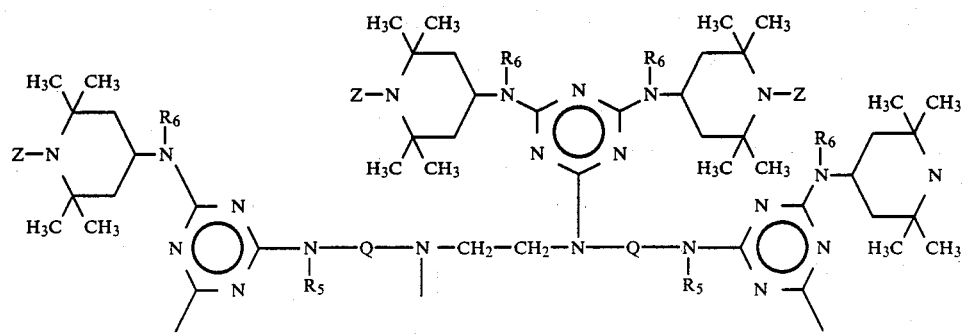
XXXII

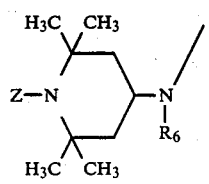 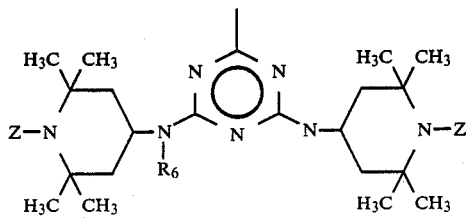 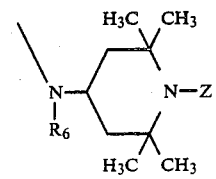

wherein:

R₅ is hydrogen, $C_1$-$C_{18}$ alkyl, or another monovalent organic radical, such as a substituted piperidyl radical;

R₆ is hydrogen, $C_1$-$C_{18}$ alkyl, in particular -$C_4H_9$, or another monovalent organic radical, such as —(CH₂-)ₙ—Y, wherein n is a whole number from 1 to 12, Y is a —OH or a OR group, R being as hereinafter defined, or a

group, wherein R is a $C_1$-$C_{18}$ alkyl radical, R' is a $C_1$-$C_2$ alkyl radical, Q is a radical —CH₂—CH₂— or —CH₂—CH₂—CH₂—and Z is hydrogen.

As above indicated the HALS stabilizers are added to the polymerization systems before, during the polymerization of the olefinic monomer or monomers, or to the polymerization slurry, at the end of the polymerization, but before quenching the catalyst system.

The catalysts suitable for the process of the present invention are obtained by reaction of an Al-alkyl compound with a solid component selected from (1) a product comprising a titanium compound and a magnesium dihalide in active form, and (2) a product comprising a tetravalent titanium compound supported onto a trivalent titanium halide having a surface area greater than 50 m²/g.

In case (1) propylene and other alpha-olefins are polymerized using a stereospecific catalyst comprising the reaction product of an Al-alkyl compound and an electrondonor compound with a component comprising a Ti-compound, in particular TiCl₁₄, and an electron-donor compound supported on a Mg dihalide in the active form.

Mg dihalide in active form is characterized by a X-ray spectrum wherein the most intense reflection which appears in the powder spectrum of magnesium dihalide of normal type is less intense and in its place a halo appears.

Examples of such catalysts supported on active Mg dihalides are described in U.S. Pat. No. 4107413; 4107414 and 4226741 and 4298718.

Catalysts endowed with high stereospicifity and activity are preferably prepared with methods which lead to the formation of components comprising the Ti compound on magnesium dihalide, which do not contain or contain only in small percentages, of titanium compounds extractable with boiling heptane and TiCl₄ at 80° C.

The preparation of these catalysts is generally carried out under conditions in which the solid comprising the magnesium dihalide in active form is reacted in suspension in TiCl₄; the excess of TiCl₄ is then removed by filtration at a temperature at which essentially no Ti compound, extractable with boiling heptane and TiCl₄ at 80° C., remains on the solid; then the solid is washed repeatedly with hydrocarbon solvents in order to remove any trace of soluble compound of Ti. According to other methods, Mg dihalide, electron-donor compound, and Ti compound, optionally in the presence of coadjuvant agents for the grinding, are co-pulverized until the magnesium dihalide is activated, namely until, in the X-ray spectrum of Mg dihalide, a halo appears in place of the most intense line appearing in the spectrum of magnesium dihalide of normal type.

The solid is then subjected to a heat-treatment with a halogenated hydrocarbon compound and the liquid phase is separated by heat-filtration in order to remove the soluble compounds. Finally the solid is further washed with an aliphatic hydrocarbon.

Examples of these methods are described in European patent applications No. 4789 and No. 4791.

According to another method described in U.S. Pat. No. 4146502, the solid catalytic component is obtained by cogrinding both of a Mg dihalide and of an electron-donor compound, then treating with an excess of TiCl₄ under heat, and then further treating in suspension in a halogenated hydrocarbon solvent, separating from the liquid phase and finally washing repeatedly with a hydrocarbon solvent.

In the case of a polymerization carried out in a batch process, the stabilizing agent can be introduced into the reactor before or together with the components of the catalytic system or successively when the polymerization has already started.

In the continuous system it can be fed into the reactor together with the catalyst or separately.

In the case of two or more reactors in series, it can be fed into any one of them.

The amount of stabilizer that may be added, either into the polymerization medium or, alternatively, to the polymer before quenching the catalyst, is from 0.01 to 1% by weight based on the polymer and, preferably between 0 o5 and o.5%.

The amount of stabilizer to be added before or during polymerization can be calculated taking into account the yield of the catalyst employed With a catalyst having a yield in liquid monomer comprised between 20,000 and 50,000 g/g of solid catalyst component, the amount of stabilizer to be added before or during the polymerization in liquid monomer ranges from 2 to 500 g/g of solid catalyst component.

The process of the present invention is applied to the preparation of olefin polymers comprising crystalline homo-and copolymers, such as the linear high- and low-density polyethylene, polypropylene, crystalline propylene-ethylene copolymers containing prevailing amounts of propylene, high impact polypropylene, polybutene, poly (4, -methyl-1-pentene) and amorphous polymers such as the elastomeric ethylene-propylene copolymers, optionally containing diene comonomers.

The following examples will illustrate the invention without limiting it.

Examples 1-6 relate to the use of the catalytic system prepared according to the process described in example 3 of U.S. Pat. No. 4331561, the process of which is incorporated by reference, and show the effectiveness of the different piperidyl compounds of this invention as in situ stabilizing agents.

The piperidyl compounds are added when the polymerization reaction is about half-way complete.

Examples 7-9 are the same as examples 1-6, except that a $MgCl_2$ supported catalytic system as described hereinafter in example 7, is used instead.

Example 10 shows that the stabilizing agent of this invention can be fed together with the catalyst.

Examples 11, 12 and 13 show the negative effect on the isotacticity index of the polymer when the catalytic system based on $TiCl_3/DEAC$ is used.

Examples 14-16 show the disadvantages of adding hindered phenolic stabilizing agents during the polymerization reaction.

Example 17 exemplifies the stabilization carried out according to the traditional method, by using a HALS stabilizer.

Examples 18 and 20 relate to the preparation of copolymers of ethylene with butene 1- and propylene, respectively, while examples 19 and 21 relate to the preparation of the same copolymers, adding during the polymerization a stabilizing agent according to the present invention.

All the test data is set forth in Table I.

EXAMPLE 1 (comparative)

A catalytic mixture is prepared by first mixing 5 mmoles of Al (i-Bu)$_3$ and 1.67 mmoles of methyl paratoluate with 50 ml of hexane and then, after 5 minutes at room temperature, introducing the amount specified in the Table of a catalytic component prepared according to the process described in U.S. Pat. No. 4,331,561 in example 3.

2.25 l of hydrogen and 0.9 Kg of propylene are introduced into a steel autoclave having a capacity of 3 liters, equipped with stirrer and thermostat and the temperature is brought to 70° C.

The catalytic mixture is then added to the autoclave. After two hours the stirring is stopped and the residual propylene is quickly degassed The resultant polymer is treated for 10 minutes with steam at 100°C, then dried in an oven at 50°C. under a nitrogen flow, up to constant weight.

The following analytical procedures are carried out on the polymer, according to standard methods isotacticity index, by extraction with boiling n-heptane for 1 hour intrinsic viscosity in tetrachloroethylene at 135° C.

resistance against oxidation (T.O. 150° C.) in an oven at 150° C. (Method ASTM D-3012).

induction time to the oxidation at 180° C. (Ox. I.T. 180° C.) (D.D. Marshall et al. Polym. Eng. & Sci., 13 (6), 415 (1973) ).

The results, reported in the Table, show that the resultant polymer has no significant resistance to thermal oxidation.

EXAMPLES 2-6

The procedure and ingredients of example 1 are used, except that, after 1 hour from the commencement of polymerization, the stabilizing agents indicated in the Table are introduced into the autoclave in the specified amount, in the form of a solution in 50 ml of hexane or in the form of a suspension in the same quantity of hexane.

The results reported in the Table show that the resultant polymer exhibits no particular colouring and has high thermal stability. Moreover the catalyst performances are unaltered.

EXAMPLE 7 (comparative)

The procedure and ingredients of example 1, are used, except that a solid catalyst component prepared according the method hereinafter described, together with 5 mmoles of AlEt$_3$ and 0.25 mmoles of phenyltriethoxysilane, is used instead. The solid catalyst component is prepared in the following way. 86.8 g of anhydrous $MgCl_2$ (water content of less than 1%) and 18 g of diisobutyl phthalate were coground in a vibratory mill of the VIBRATOM type, built by Siebtechnik, having a total volume of 1000 cc and containing 3.485 kg of inox steel spheroids of 15.8 mm diameter.

The grinding was carried out adopting a filling coefficient equal to 120 g per liter of the total volume, at a temperature inside the mill of about 70° C., and for a grinding time of 60 hours.

The loading of the mill with the products to be ground, the successive grinding and the discharge of the ground product from the mill are carried out in an atmosphere of dry nitrogen.

25 g of the co-ground product of (a) were transferred, still under nitrogen atmosphere, into a 500 cc reactor, in which they were brought into contact with 210 cc of $TiCl_4$.

The treatment with $TiCl_4$ was carried out at 80° C. for 2 hours, under stirring at 100 rpm, after which the excess $TiCl_4$ and the products dissolved in it were removed at 80° C. by syphoning. This operation was followed by 5 washings with hexane at 65° C., using 200 cc for each washing. In this case as well, the resultant polymer lacks any significant thermal stability.

EXAMPLES 8-9

The procedure and ingredients of example 7 are used, except that after 1 hour from the commencement of the polymerization, the specified amounts of the stabilizing agents indicated in the Table are introduced into the autoclave. The resultant polymer is free from colouring and endowed with a high thermal stability, and the catalyst performance is not affected.

EXAMPLE 10

The procedure and ingredients of examples 2-6 are used except that the stabilizing agent is introduced into the autoclave together with the catalyst. A comparison of the test results conducted on the polymer thus prepared with the polymer prepared in example 2 shows that the point at which the stabilizing agent is added during the polymerization reaction is not critical.

EXAMPLE 11 (comparative)

The procedure and ingredients of example 1 are used except that, as activated catalyst, a $TiCl_3.0.33\ AlCl_3$ is used, and 10 mmoles of AlEt$_2$Cl as co-catalyst is used instead. A polymer is obtained without any significant thermal stability.

EXAMPLES 12-13 (comparative)

The procedure and ingredients of example 11 are used, except that the stabilizing agent, in the amount indicated on the Table, is introduced into the autoclave together with the catalyst.

By comparison with the test results of example 11 one can see that, with this catalytic system, the addition of the stabilizing agent lowers, to an unacceptable degree, the isotacticity index of the polymer.

EXAMPLES 14-16 (comparative)

The procedure and ingredients of examples 2-6 are used, except that stabilizing agents of hindered phenolic type are used instead as indicated in the Table.

The results show that such stabilizing agents, although added in a lower amount than to the hindered piperidyl stabilizers of this invention, either interfer with the catalytic performances (ex. 14) or impart an undesired colouring to the polymer (ex. 15 and 16).

EXAMPLE 17 (comparative)

The example relates to a polymer stabilized by the traditional method, namely by adding the additive during the granulation of the polymer obtained according to example 7. A comparison of examples 2, 8 and lo with example 17 shows that stabilization carried out according to the present invention, gives a result better than the one carried out with the traditional method.

EXAMPLE 18 (comparative)

Into a stainless steel autoclave having a capacity of 2.5 1, equipped with a stirrer and a thermoregulating device, there is introduced, at room temperature and in an isobutane stream, a catalytic mixture consisting of 0.6 g of AlEt$_3$ and of 8.8 mg of a catalyst prepared according to example 3 of U.S. Pat. No. 4218339, along with 20 ml of hexane. 350 g of isobutane is then introduced and the temperature is quickly brought to 65° C.

H$_2$ is added up to a pressure of 12.5 kg/cm$^2$ gauge, then 300 g of butene-1 is added and the total pressure is brought to 25 kg/cm$^2$ gauge with ethylene.

The autoclave is maintained at 65° C. and 25 kg/cm$^2$ gauge during two hours by continuously replenishing the consumed ethylene and butene-1.

After 2 hours, stirring is stopped and the monomer mixture as well as the solvent is allowed to evaporate quickly. The resulting slurry is treated with steam at 100° C. for 10 minutes, then it is dried at 70° C. under a nitrogen stream 220 g of a copolymer is obtained containing 8.2% by weight of butene and 91.8% by weight of ethylene, such polymer being characterized, as is apparent from the values reported in the Table, by a very low resistance to thermal oxidation.

EXAMPLE 19

The procedure and ingredients of example 18 are used, except that 8.6 mg of solid catalyst component are used, and 10 ml of hexane containing 0.32 g of CHIMASSORB 944 is injected into the autoclave, under an ethylene pressure, after a 1-hour from the commencement of the polymerization reaction. 207 g of copolymer are obtained, having 6.5% by weight of butene, containing 1540 ppm of stabilizer and endowed with a much higher resistance to thermal oxidation than the resultant copolymer in the preceding example.

EXAMPLE 20 (comparative)

Into the same autoclave utilized example 18 there are introduced, at room temperature and under gaseous propylene flow, 1.1 g of (i—C$_4$—H$_9$)$_3$Al dissolved in 25 ml of hexane. Subsequently, 750 g of propylene are added, the temperature is quickly brought to 40° C. and ethylene was fed till reaching a total pressure of 18.8 kg/cm$^2$ gauge.

Then a suspension consisting of 50 ml of hexane and 5.3 mg of the same catalyst as used in example 18 is introduced, under an ethylene pressure, into the autoclave.

The autoclave is maintained at 40° C. and 18.8 kg/cm$^2$ g during 1 hour, while continuously replenishing the consumed ethylene.

After two hours the stirring is stopped and 160 g of a rubber-like polymer is recovered according to the procedure set forth in example 18. The resultant copolymer contains 55.4% by weight of ethylene and 44.6% by weight of propylene, and has an inherent viscosity equal to 4.05 dl/g. The yield is of 30.2 kg of polymer/g of catalyst. As is show from the data in the Table, the resistance to thermal oxidation is very low.

EXAMPLE 21

The procedure and the ingredients of example 20 are used except that 5 mg of solid catalyst component are used and, 30 minutes after the commencement of the polymerization, 10 ml of hexane containing 0.39 g of CHIMASSORB 905 is introduced into the autoclave, under ethylene pressure.

At the end of the test there is obtained 140 g of a copolymer having 55.5% by weight of ethylene and 44.5% by weight of propylene, and exhibiting an inherent viscosity equal to 4.2 dl/g.

The yield was of 28 kg of polymer/g of catalyst.

The polymer contains 2860 ppm of the stabilizing compound and, as is shown in the results in the Table, it has a much higher resistance to thermal oxidation than the polymer of Example 20.

| EXAMPLE N. | STABILIZING AGENT Type/weight (g) | CATALYST (g) | OBTAINED POLYMER (g) | YIELD (Kg/pol/ g/cat) | ISOTACTICITY INDEX (%) | INTRINSEC VISCOSITY (dl/g) |
|---|---|---|---|---|---|---|
| 1 (comp) | — | 0.030 | 360 | 12.0 | 93.0 | 1.75 |
| +2 | Chimassorb 944-0.561 | 0.0272 | 340 | 12.5 | 92.8 | 1.80 |
| 3 | Cyasorb UV 3346-0.585 | 0.0322 | 380 | 11.8 | 93.0 | 1.9 |
| 4 | Chimassorb 905-0.508 | 0.0348 | 400 | 11.5 | 92.9 | 1.7 |
| 5 | Tinuvin 144-0.372 | 0.0258 | 310 | 12.0 | 92.6 | 1.95 |
| 6 | Spinuvex A 36-0.450 | 0.0257 | 270 | 10.5 | 92.9 | 2.0 |
| 7 (comp) | — | 0.0195 | 450 | 23.1 | 94.1 | 1.7 |
| 8 | Chimassorb 944-0.588 | 0.0312 | 340 | 25 | 93.8 | 1.83 |
| 9 | Cyasorb UV 3346-0.720 | 0.0195 | 450 | 23.1 | 94.1 | 1.95 |
| 10 | Chimassorb 944-0.588 | 0.0312 | 340 | 11.9 | 93.2 | 1.80 |

-continued

| | | | | | | |
|---|---|---|---|---|---|---|
| 11 (comp) | — | 0.090 | 342 | 3.8 | 88.0 | 1.6 |
| 12 (comp) | Cyasorb UV 3346-0.324 | 0.090 | 360 | 4.0 | 50.0 | 1.4 |
| 13 (comp) | Chiassorb 944-0.321 | 0.091 | 345 | 3.8 | 50 | 1.5 |
| 14 (comp) | Irganox 1010-0.156 | 0.030 | 300 | 10.0 | 89.5 | 1.4 |
| 15 (comp) | Irganox 1330-0.219 | 0.025 | 300 | 12.0 | 92.0 | 1.85 |
| 16 (comp) | Cyanox 2246-0.220 | 0.033 | 350 | 10.6 | 92.5 | 1.7 |
| 17 (comp) | Chimassorb 944 | Stabilizing agent added during the extrusion stage | | | | |
| 18 (comp) | — | 0.0088 | 220 | 25 | not. det. | MIE = 0.89 |
| 19 | Chimassorb 944-0 32 | 0.0086 | 207 | 24.1 | not. det. | MIE = 0.98 |
| 20 (comp) | — | 0.0053 | 160 | 30.2 | not. det. | [M] = 4.05 |
| 21 | Chimassorb 905-0 39 | 0.005 | 140 | 28 | not. det. | [M] = 4.2 |

| EXAMPLE N. | STABILIZING AGENT Type/weight (g) | COLOUR | STABILIZING AGENT CONC. (ppm) | Ox I.T. a 180° C. (minutes) | T.O. at 150 (days) |
|---|---|---|---|---|---|
| 1 (comp) | — | white | — | 0 | 1 |
| +2 | Chimassorb 944-0.561 | white | 1650 | 27' | 16 |
| 3 | Cyasorb UV 3346-0.585 | white | 1540 | 30' | 11 |
| 4 | Chimassorb 905-0.508 | white | 1270 | 16' | 22 |
| 5 | Tinuvin 144-0.372 | white | 1200 | 7' | 1 |
| 6 | Spinuvex A 36-0.450 | white | 1670 | 33' | 4 |
| 7 (comp) | — | white | — | 0' | 1 |
| 8 | Chimassorb 944-0.588 | white | 1680 | 28' | 16 |
| 9 | Cyasorb UV 3346-0.720 | white | 1600 | 35' | 12 |
| 10 | Chimassorb 944-0.588 | white | 1730 | 28' | 17 |
| 11 (comp) | — | white | — | 0' | 1 |
| 12 (comp) | Cyasorb UV 3346-0.324 | white | 900 | n.d. | n.d. |
| 13 (comp) | Chiassorb 944-0.321 | white | 930 | n.d. | n.d. |
| 14 (comp) | Irganox 1010-0.156 | white | 520 | n.d. | n.d. |
| 15 (comp) | Irganox 1330-0.219 | yellow | 730 | 5' | n.d. |
| 16 (comp) | Cyanox 2246-0.220 | deep yellow | 630 | 11' | n.d. |
| 17 (comp) | Chimassorb 944 | | 2000 | 17' | n.d. |
| 18 (comp) | — | white | — | 5' | 9* |
| 19 | Chimassorb 944-0 32 | white | 1540 | >75' | >15* |
| 20 (comp) | — | white | — | 4' | not. det. |
| 21 | Chimassorb 905-0 39 | white | 2860 | >40' | not. det. |

*Determined at 120° C.

Chimassoarb 944 is an oligomeric compound produced by CHIMOSA Chim. Org. S.p.A. Company having formula:

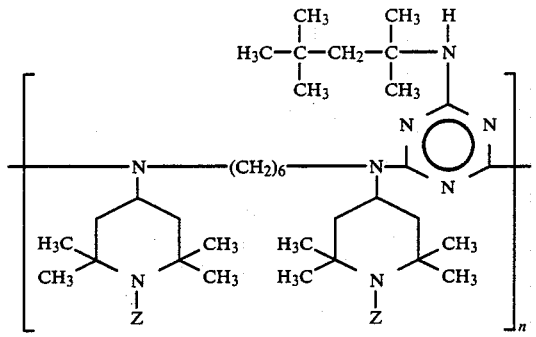

wherein Z is hydrogen and n is a whole number from 2 to 20.

Cyasorb UV 3346 is an oligomeric compound produced by Am. Cyanamide Company having formula:

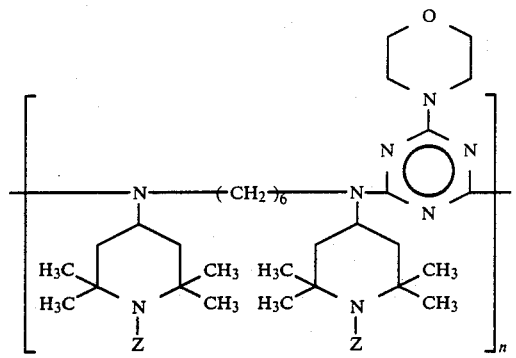

wherein Z is hydrogen and n is a whole number from 2 to 20.

Chimassorb 905 is a monomeric compound produced by CHIMOSA Chim. Org. S.p.A. Company having formula:

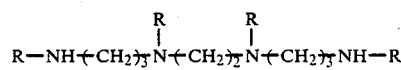

wherein R is

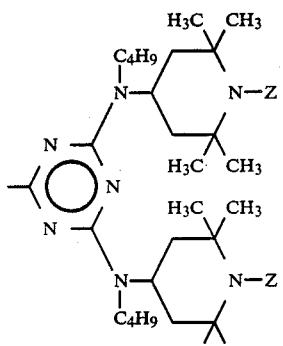

wherein Z is hydrogen.

Tinuvin 144 is a monomeric compound produced by CIBA GEIGY Company having formula:

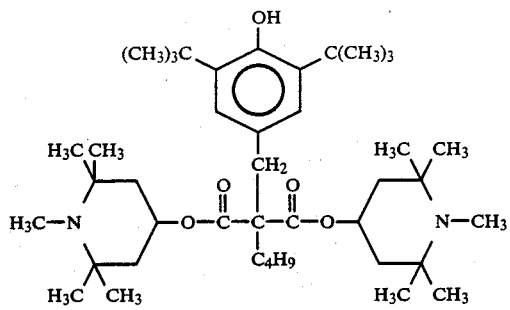

Spinuvex A 36 is an oligomeric compound produced by
Montedison S.p.A. Company having formula:

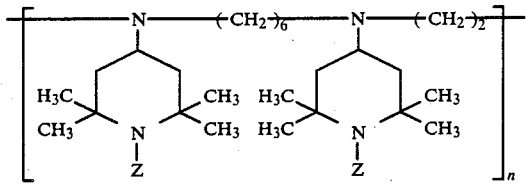

wherein Z is hydrogen and n is a whole number from 2 to 20.

Irganox 1010 is a monomeric compound produced by CIBA GEIGY Company having formula:

wherein R is

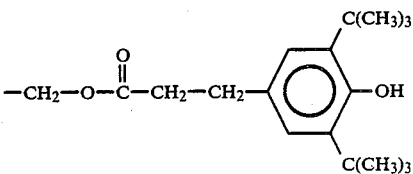

Irganox 1330 is a monomeric compound produced by CIBA GEIGY Company having formula:

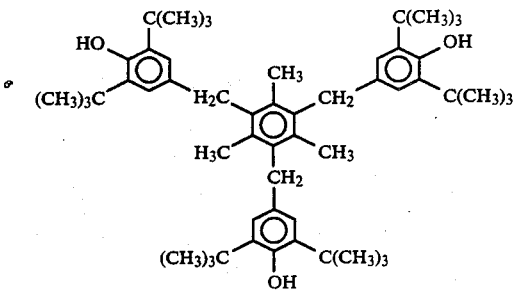

Cyanox 2246 is a monomeric compound produced by American Cyanamide Company having formula:

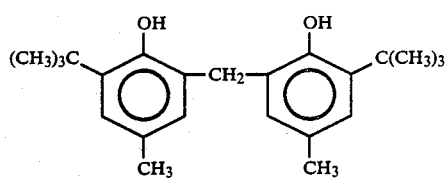

What is claimed is:

1. A process for the manufacture of thermally stable, alpha-olefin polymers, which polymers are obtained by means of catalysts prepared by reaction of an aluminum alkyl compound with a solid component selected from a product comprising a titanium compound and a magnesium dihalide in active form, and a product comprising a tetravalent titanium compound supported onto a trivalent titanium halide having a surface area greater than 50 $m^2/g$, which process consists in adding before or during polymerization or after polymerization is substantially complete, but before quenching the catalyst, a stabilizer containing in the molecule one or more substituted piperidyl groups having the following general formula:

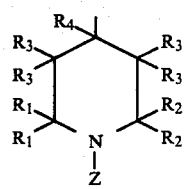

I wherein $R_1$ are the same or different from each other and are $C_1$–$C_4$ alkyl radicals, tetramethylpiperidyl radicals, or the alkyl radicals, together with the piperidyl carbon atom to which they are bonded, form a $C_5$–$C_9$ cycloalkyl radical; $R_2$ are the same or different from each other and are hydrogen, $C_1$–$C_{18}$ alkyl radicals, $C_7$-$C_{18}$ aralkyl radicals, or said alkyl radicals together with the piperidyl carbon atom to which they are bonded, are a $C_5$-$C_{10}$ cycloalkyl radical; $R_3$ are the same or different from each other and are hydrogen, $C_1$-$C_{18}$ alkyl radicals or $C_7$-$C_{18}$ aralkyl radicals; $R_4$ is hydrogen, a $C_1$-$C_8$ alkyl radical or a benzyl radical; Z is hydrogen or $C_1$-$C_{18}$ alkyl; $C_1$-$C_{12}$ alkylene; $C_3$-$C_{12}$ alkenyl; $C_3$-$C_5$ alkynyl; $C_7$-$C_{18}$ aralkyl; $C_2$-$C_4$ acyl; $C_2$-$C_{18}$ alkanoyl; $C_3$-$C_{18}$ alkoxyalkyl; $C_3$-$C_{18}$ alkenoyl; oxyl; cyanomethyl, and xylylenyl radicals; a radical having valence from 1 to 4 and containing from 1 to 4 hydroxyl groups and, optionally, containing ether, ester, or heterocyclic groups, all the valences of this radical being bonded to the nitrogen of the piperidyl rings; a bivalent radical containing one or more ester or amide groups, and a radical

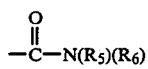

wherein $R_5$ and $R_6$ are hydrocarbyl radicals.

2. A process according to claim 1, wherein Z in the general formula I is a $C_1$-$C_{12}$ alkyl, $C_3$-$C_8$ alkenyl, $C_7$-$C_{11}$ aralkyl, or a bivalent radical containing one or more ester groups wherein the two valences of said radical are bonded to piperidyl rings.

3. A process according to claim 1, wherein the stabilizer has formula:

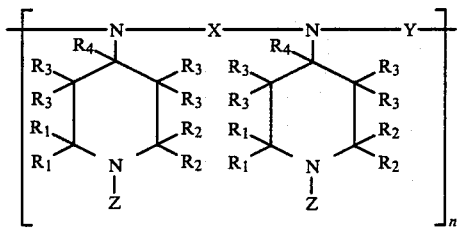

II wherein
n is a whole number from 2 to 100;
$R_1$, $R_2$, $R_3$, $R_4$ and Z have the same meaning as in claim 1;
X is a bivalent organic radical;
Y is a direct chemical bond, or a bivalent aliphatic, cycloaliphatic, aromatic or heterocyclic organic radical containing N or O, S, P atoms in the chain or in the heterocyclic ring.

4. A process according to claim 3 wherein the stabilizer has formula:

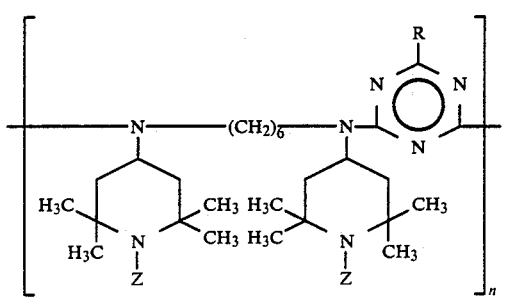

XXIV wherein:
n is a whole number from 2 to 20; Z is hydrogen and R is

or

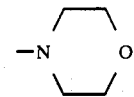

radical;
wherein $R_5$ is a $C_1$-$C_{10}$ alkyl radical.

5. A process according to claim 4 wherein $R_5$ in formula XXIV of the stabilizer is a —$C(CH_3)_2$—$CH_2$—$C(CH_3)_3$ radical.

6. A process according to claim 3 wherein the stabilizer has formula:

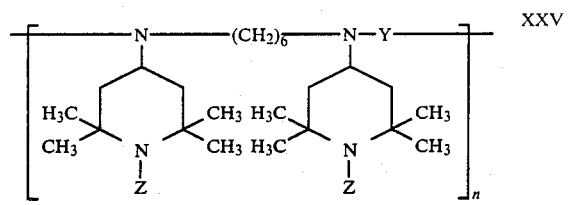

XXV wherein n is a whole number comprised from 2 to 20, Z is hydrogen and Y is a direct chemical bond or a radical —$CH_2$—$CH_2$—.

7. A process according to claim 1, wherein the stabilizer has formula:

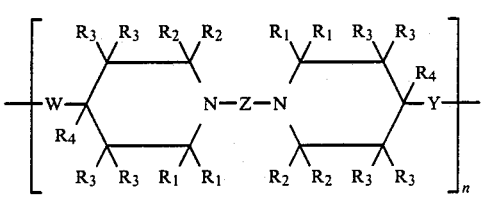

III wherein
n is a whole number from 2 to 100; $R_1$, $R_2$, $R_3$, $R_4$ have the same meaning as in claim 1;
Z is a $C_1$-$C_{12}$ alkylene radical or a bivalent radical containing one or more ester or amide groups;
W is a direct chemical bond or a bivalent organic radical, —N—R radical (wherein R is hydrogen or a $C_1$-$C_{18}$ alkyl radical), or —O—; Y is a direct chemical bond, or a bivalent aliphatic, cycloaliphatic, aromatic or heterocyclic organic radical containing N, or O, S, P atoms in the chain or in the heterocyclic ring.

8. A process according to claim 7 wherein the stabilizer has formula:

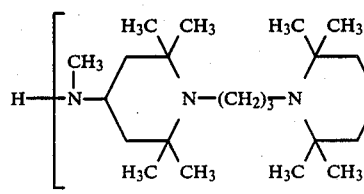

wherein n is a whole number from 2 to 20.

9. A process according to claim 7 wherein the stabilizer has formula:

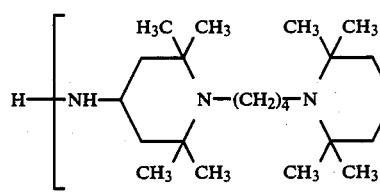

wherein n is a whole number from 2 to 20.

10. A process according to claim 1, wherein the stabilizer has formula:

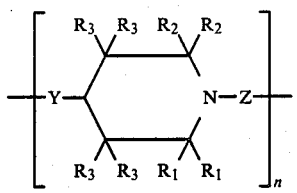

wherein
n, Y, $R_1$, $R_2$, $R_3$ and $R_4$ have the same meaning as in claim 1;
Z is a $C_1$–$C_{12}$ alkylene radical or a bivalent radical containing one or more ester or amide groups.

11. A process according to claim 10 wherein the stabilizer has formula:

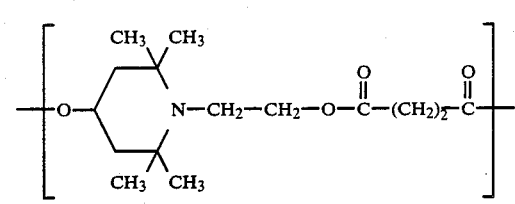

wherein n is a whole number from 2 to 20.

12. A process according to claim 1, wherein the stabilizer has formula:

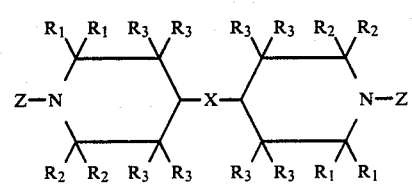

wherein
$R_1$, $R_2$, $R_3$ and Z have the same meaning as in claim 1;

X is a bivalent radical or a bivalent radical containing one or more ester or amide groups.

13. A process according to claim 12 wherein the stabilizer has formula:

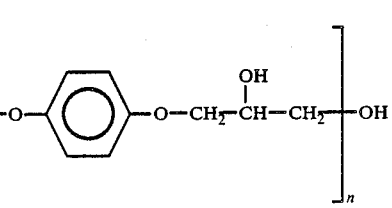

wherein Z is hydrogen or a methyl radical.

14. A process according to claim 12 wherein the stabilizer has formula:

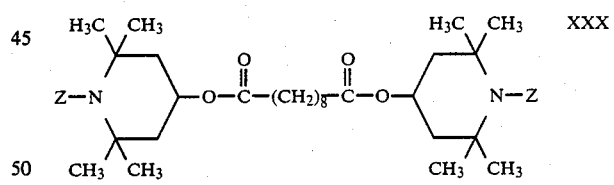

wherein Z is hydrogen.

15. A process according to claim 1, wherein the stabilizer has formula:

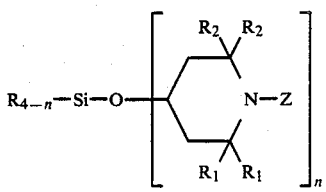

wherein Z $R_1$ and $R_2$ have the same meaning as in claim 1;
R is an alkyl, alkenyl or phenyl radical;
n is a whole number from 1 to 3.

16. A process according to claim 15 wherein the stabilizer has formula:

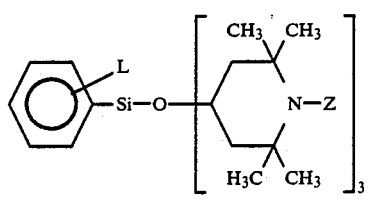

XXXI wherein L is H, halogen, or a $C_1$–$C_4$ alkyl radical.

17. A process according to claim 1, wherein the stabilizer has formula:

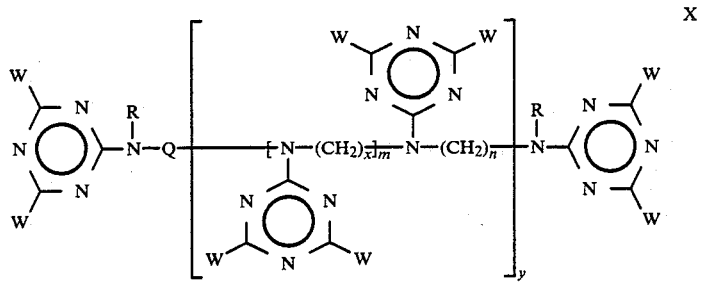

wherein

Q is a bivalent organic radical, such as a $C_1$–$C_{12}$ alkylene or phenylene radical, or a radical having fromula

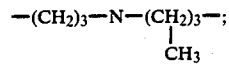

W is a substituted piperidylamino radical;
R is H, a $C_1$–$C_{18}$ alkyl, or a substituted piperidyl radical.
y is 1 or zero
x and m are 1, 2 or 3
n is 2 or 3

18. A process according to claim 17 wherein the stabilizer has general formula:

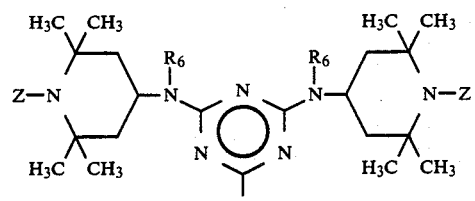

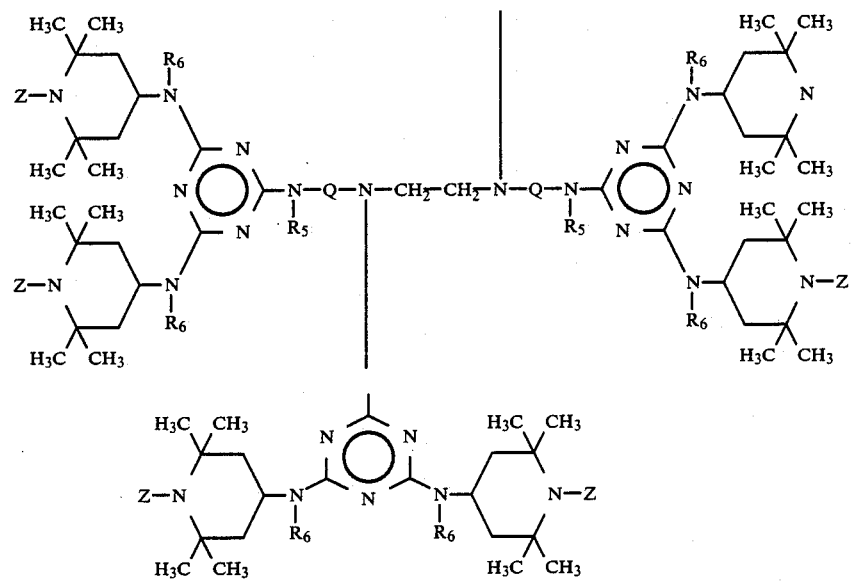

X wherein:
$R_5$ is hydrogen, $C_1$–$C_{18}$ alkyl, or a substituted piperidyl radical;
$R_6$ is hydrogen, a $C_1$–$C_{18}$ alkyl radical or a radical —$(CH_2)_n$—Y wherein n is a whole number from 1 to 12, Y is a —OH or a OR group, R being as hereinafter defined,
or a

group,
wherein R is a $C_1$-$C_{18}$ alkyl radical, R' is a $C_1$-$C_2$ alkyl radical, Q is a radical —$CH_2$—$CH_2$— or —$CH_2$—$CH_2$—$CH_2$— and Z is hydrogen

19. A process according to claim 18, wherein in the stabilizer of formula XXXII $R_5$ is hydrogen, $R_6$ is an alkyl radical —$C_4H_9$, Q is a radical —$CH_2$—$CH_2$—$CH_2$—.

20. A process according to claim 1 wherein the stabilizer is added in an amount ranging between 0.01 and 1% by weight, referred to the polymer.

21. A process according to claim 1 wherein the alpha-olefin polymers are obtained using stereospecific catalysts comprising the reaction product of an aluminum-alkyl compound with catalytic components comprising a titanium compound and an electron-donor compound, supported on a magnesium dihalide in the active form.

22. The process according to claim 1 wherein the alpha-olefin polymers are selected from the group consisting of crystalline linear high density polyethylene, low density polyethylene, polypropylene, propylene-ethylene copolymers containing prevailing amounts of propylene, high impact polypropylene, polybutene and poly(4-methyl-1-pentene); and elastomeric ethylene-propylene copolymers, optionally containing a diene monomer.

* * * * *

UNITED STATES PATENT AND TRADEMARK OFFICE
CERTIFICATE OF CORRECTION

PATENT NO. : 4,960,593

DATED : October 2, 1990

INVENTOR(S) : Franco Sevini et al.

It is certified that error appears in the above-identified patent and that said Letters Patent is hereby corrected as shown below:

On the title page:

In the Abstract, line 29, change "$C_3-C_5$ alkenyl" to --$C_3-C_5$ alkynyl--.

At col. 2, line 9, insert a period after "organic radical".

At col. 2, line 38, change "$R_3$" to --$R_4$--.

At col. 4, line 7, move "$\overset{|}{Z}$" to the left to be directly under the "N".

At col. 4, line 41, change "$C_{-C12}$" to --$C_1-C_{12}$--.

At col. 4, line 63, change "$C_{1-C12}$" to --$C_1-C_{12}$--.

At col. 5, line 61, insert -- $-N(R_8)-,$ -- before "$-NH-CH_2-CH_2-$".

At col. 5, line 62, change "$-N-(R_{10}-N-(R_9)-;$" to -- $-N-(R_8)-R_{10}-N-(R_9)-;$ --.

At col. 6, line 65, change "IX" to --VIII--.

At col. 6, line 65, change "4461898" to --4177186--.

At col. 7, line 13, change "$C_1-C_{14}$" to --$C_1-C_4$--.

At col. 8, line 39, change "alkenyl" to --alkyl--.

At col. 9, line 37, change "alkenyl" to --alkyl--.

At col. 11, line 11, change "and" to --wherein--.

At col. 11, line 20, change "2" to --Z--.

At col. 14, lines 14-18, delete "Z is hydrogen, $C_1-C_4$ alkyl, benzyl, allyl, acetyl, acryloyl, oxyl, $-CH_2CH(R_{10})OH,$"

UNITED STATES PATENT AND TRADEMARK OFFICE
CERTIFICATE OF CORRECTION

PATENT NO. : 4,960,593

DATED : October 2, 1990

INVENTOR(S) : Franco Sevini et al.

It is certified that error appears in the above-identified patent and that said Letters Patent is hereby corrected as shown below:

At col. 14, line 21, delete "or a $-CH_2CN$ radical;".

At col. 15, line 21, change "$H_5$" to --$R_5$--.

At col. 18, line 40, change "$L_2$" to --L--.

At col. 18, formula XXXII, change the extreme right piperidyl moiety from: 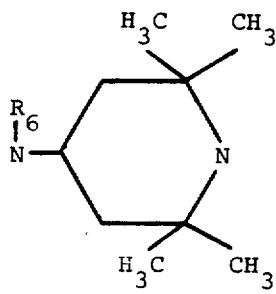   to: 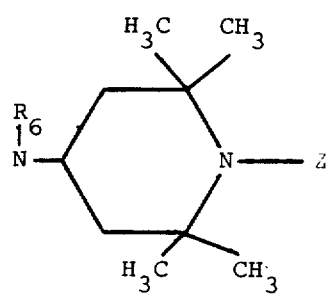

At col. 19, line 10, on the N atom bonded to the triazine moiety on the left and on the piperidyl moiety on the right, insert "$\underset{R_6}{|}$".

At col. 19, line 47, change "$TiCl_{14}$" to --$TiCl_4$--.

At col. 20, line 53, change "0 o5" to --0.05-- and "o.5%" to --0.5%--.

UNITED STATES PATENT AND TRADEMARK OFFICE
CERTIFICATE OF CORRECTION

PATENT NO. : 4,960,593

DATED : October 2, 1990

INVENTOR(S) : Franco Sevini et al.

It is certified that error appears in the above-identified patent and that said Letters Patent is hereby corrected as shown below:

At col. 23, line 29, change "lo" to --10--.

Signed and Sealed this

Seventh Day of April, 1992

*Attest:*

HARRY F. MANBECK, JR.

*Attesting Officer*  *Commissioner of Patents and Trademarks*